(12) United States Patent
Weigang et al.

(10) Patent No.: US 7,908,127 B2
(45) Date of Patent: Mar. 15, 2011

(54) METHOD AND SYSTEM FOR SCHEDULING A STREAM OF PRODUCTS IN A MANUFACTURING ENVIRONMENT BY USING A SIMULATION PROCESS

(75) Inventors: Joerg Weigang, Dresden (DE); Robert Ringel, Dresden (DE); Arndt Herrmann, Dresden (DE)

(73) Assignee: GlobalFoundries, Inc., Austin, TX (US)

( * ) Notice: Subject to any disclaimer, the term of this patent is extended or adjusted under 35 U.S.C. 154(b) by 852 days.

(21) Appl. No.: 11/538,588

(22) Filed: Oct. 4, 2006

(65) Prior Publication Data

US 2007/0179652 A1   Aug. 2, 2007

(30) Foreign Application Priority Data

Jan. 31, 2006   (DE) .......................... 10 2006 004 413

(51) Int. Cl.
 *G06G 7/48*   (2006.01)
(52) U.S. Cl. .............................. 703/6; 703/13; 700/100
(58) Field of Classification Search ................ 703/6, 13; 700/100

See application file for complete search history.

(56) References Cited

U.S. PATENT DOCUMENTS

| | | | | |
|---|---|---|---|---|
| 5,818,716 | A | * | 10/1998 | Chin et al. ................ 700/100 |
| 6,438,436 | B1 | * | 8/2002 | Hohkibara et al. ........... 700/97 |
| 6,961,634 | B1 | | 11/2005 | Logsdon et al. ........... 700/100 |
| 7,522,968 | B2 | * | 4/2009 | Hongkham et al. ......... 700/100 |
| 2003/0171972 | A1 | * | 9/2003 | Heskin ....................... 705/9 |

OTHER PUBLICATIONS

Atherton et al., "Detailed Simulation for Semiconductor Manufacturing", Proceedings of the 1990 Winter Simulation Conference, Dec. 1990, pp. 659-663.*
Shin et al., "Modeling and Implementing a Real-Time Scheduler for Dual-Armed Cluster Tools", Computer in Industry, vol. 45, Issue 1, May 2001, pp. 13-27.*
Kulvatunyou et al., "Computer-Aided Manufacturing Simulation (CAMS) Generation for Interactive Analysis: Concepts, Techniques, and Issues", Proceedings of the 2001 Winter Simulation Conference, 2001, pp. 968-976.*
Song et al., "A Virtual Shop Modeling System for Industrial Fabrication Shops", Simulation Modelling Practice and Theory, vol. 14, Issue 5, Jul. 2006, pp. 649-662.*
Gogg et al., "Introduction to Simulation", Proceeding of the 25th Conference on Winter Simulation, 1993, pp. 9-17.*
Foreign Associate Transmittal Letter mailed Mar. 17, 2008.
Translation of Official Communication issued Feb. 6, 2008.

* cited by examiner

*Primary Examiner* — Kamini S Shah
*Assistant Examiner* — Herng-Der Day
(74) *Attorney, Agent, or Firm* — Williams, Morgan & Amerson

(57) ABSTRACT

By simulating a manufacturing environment on the basis of appropriate simulation models, a schedule may be established in which process restrictions, tool availability and product entity status are automatically taken into consideration. Moreover, by estimating the process flow efficiency provided by a simulated time progression of the process flow in the environment, an optimized schedule may be established, which may be accomplished by identifying less efficient product entities and re-scheduling one or more product entities in order to obtain an enhanced process flow efficiency. The technique of the present invention may be advantageously applied to the processing of advanced mass products requiring sophisticated process tools and process sequences, such as the processing of semiconductor devices.

21 Claims, 5 Drawing Sheets

METHOD AND SYSTEM FOR SCHEDULING A STREAM OF PRODUCTS IN A MANUFACTURING ENVIRONMENT BY USING A SIMULATION PROCESS

BACKGROUND OF THE INVENTION

1. Field of the Invention

Generally, the present invention relates to manufacturing processes, and, more particularly, to the scheduling of product streams in a manufacturing environment, such as a semiconductor facility, in which a plurality of different product types and process and metrology tools are handled.

2. Description of the Related Art

Today's global market forces manufacturers of mass products to offer high quality products at a low price. It is thus important to improve yield and process efficiency to minimize production costs. This holds especially true in industrial fields, in which highly complex process tools operate on complex products according to specified process parameters that may vary between different product types. A prominent example in this respect represents the field of semiconductor fabrication, since, here, it is essential to combine cutting-edge technology with mass production techniques. It is, therefore, the goal of semiconductor manufacturers to reduce the consumption of raw materials and consumables while at the same time improve process tool utilization. The latter aspect is especially important, since, in modern semiconductor facilities, equipment is required which is extremely cost-intensive and represents the dominant part of the total production costs.

Integrated circuits, as one example for a mass product, are typically manufactured in automated or semi-automated facilities, thereby passing through a large number of process and metrology steps to complete the device. The number and the type of process steps and metrology steps a product, such as a semiconductor device, has to go through depends on the specifics of the product to be fabricated. For example, a typical process flow for an integrated circuit may include a plurality of photolithography steps to image a circuit pattern for a specific device layer into a resist layer, which is subsequently patterned to form a resist mask for further processes for structuring the device layer under consideration by, for example, etch or implant processes, deposition processes, heat treatments, cleaning processes and the like. Thus, layer after layer, a plurality of process steps are performed based on a specific lithographic mask set for the various layers of the specified device. For instance, a sophisticated CPU requires several hundred process steps, each of which has to be carried out within specified process margins to fulfill the specifications for the device under consideration. Since many of these processes are very critical, a plurality of metrology steps have to be performed to efficiently control the quality of the process flow. Typical metrology processes may include the measurement of layer thickness, the determination of dimensions of critical features, such as the gate length of transistors, the measurement of dopant profiles and the like. As the majority of the process margins are device-specific, many of the metrology processes and the actual manufacturing processes are specifically designed for the device under consideration and require specific parameter settings at the adequate metrology and process tools.

In many production plants, such as semiconductor facilities, a plurality of different product types are usually manufactured at the same time, such as memory chips of different design and storage capacity, CPUs of different design and operating speed and the like, wherein the number of different product types may even reach a hundred and more in production lines for manufacturing ASICs (application specific ICs). Since each of the different product types may require a specific process flow, specific settings in the various process tools, such as different mask sets for the lithography, different process parameters for deposition tools, etch tools, implantation tools, chemical mechanical polishing (CMP) tools, furnaces and the like may be necessary. Consequently, a plurality of different tool parameter settings and product types may be encountered simultaneously in a manufacturing environment.

Hereinafter, the parameter setting for a specific process in a specified process tool or metrology or inspection tool may commonly be referred to as process recipe or simply as recipe. Thus, a large number of different process recipes, even for the same type of process tools, may be required which have to be applied to the process tools at the time the corresponding product types are to be processed in the respective tools. However, the sequence of process recipes performed in process and metrology tools or in functionally combined equipment groups, as well as the recipes themselves, may have to be frequently altered due to fast product changes and highly variable processes involved. As a consequence, the tool performance, especially in terms of throughput, is a very critical manufacturing parameter as it significantly affects the overall production costs of the individual products. Therefore, in the field of semiconductor production, various strategies are practiced in an attempt to optimize the stream of products for achieving a high yield with moderate consumption of raw materials. In semiconductor plants, substrates are usually handled in groups, called lots, wherein, in a frequently encountered strategy, the dispatching of a sequence of lots for a given group of process tools, in which at least a part of the manufacturing process is to be performed, is determined on the basis of the current state of the lots and the tools, such that efficient processing of the lots may be achieved. Thus, a so-called dispatch list may be established when demanded by an operator or an automated supervising system, which may describe the sequence of releasing the various lots in an attempt to obtain efficient routing of the released lots through the process flow under consideration.

Another approach for generating an efficient stream of products through a manufacturing environment is referred to as scheduling and includes the calculation of a schedule for the lots and process tools over a certain time interval or time horizon into the future. Based on the current tool and lot status and using predefined functions with respect to manufacturing specific criteria, the schedule may be "optimized," wherein, however, changes of the manufacturing environment, in terms of tool availability, process recipe changes and the like, may require frequent updating of the schedule, wherein the consideration of all relevant constraints and process criteria, such as efficient handling of so-called re-entrant processes, in which products are repeatedly processed in the same process tools, however, at different stages of the manufacturing process, may not be efficiently handled by conventional strategies, thereby reducing the effect of the schedule for enhancing the productivity in the manufacturing environment under consideration.

In view of the situation described above, there is therefore a need for a technique that enhances the efficiency of a production process while avoiding or reducing one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present invention is directed to a method and a system for efficiently determining a schedule of product entities within a specific manufacturing environment including a plurality of process tools, wherein the scheduling of the various product entities within the manufacturing environment is obtained on the basis of a simulation model of the manufacturing environment, thereby enabling the consideration of any restrictions and constraints for the specific manufacturing environment. Consequently, the technique of the present invention offers a high degree of flexibility with respect to adaptation to any specific manufacturing environment and process flow characteristics, since the simulation model per se provides a schedule that may automatically comprise any such process restrictions and constraints. Furthermore, using a simulation model of the manufacturing environment has the ability of efficiently coping with re-entrant process flows, as are frequently encountered in highly complex semiconductor manufacturing processes.

According to one illustrative embodiment of the present invention, a method comprises initializing a simulation model of a manufacturing environment with process information from a plurality of process tools of the manufacturing environment and a plurality of product entities to be processed or being processed in the manufacturing environment according to a plurality of process recipes. The method further comprises performing a simulation of a process sequence for the plurality of product entities in the manufacturing environment on the basis of the process information, the one or more process recipes and a model for each of the plurality of process tools to generate a simulation result of the process sequence. Finally, the method comprises establishing a schedule for processing the plurality of product entities in the manufacturing environment using the simulation result.

According to another illustrative embodiment of the present invention, a product scheduling system comprises an input section configured to receive process information of a plurality of product entities and a plurality of process tools of a manufacturing environment, wherein the plurality of product entities is to be processed or are currently being processed in the manufacturing environment according to a plurality of process recipes. The system further comprises a process simulator configured to determine a time progression of a process flow of each of the plurality of product entities in the manufacturing environment on the basis of the process information. Furthermore, the system comprises a process scheduler configured to establish a schedule for each of the product entities on the basis of the time progression.

BRIEF DESCRIPTION OF THE DRAWINGS

The invention may be understood by reference to the following description taken in conjunction with the accompanying drawings, in which like reference numerals identify like elements, and in which.

Figure 1A:
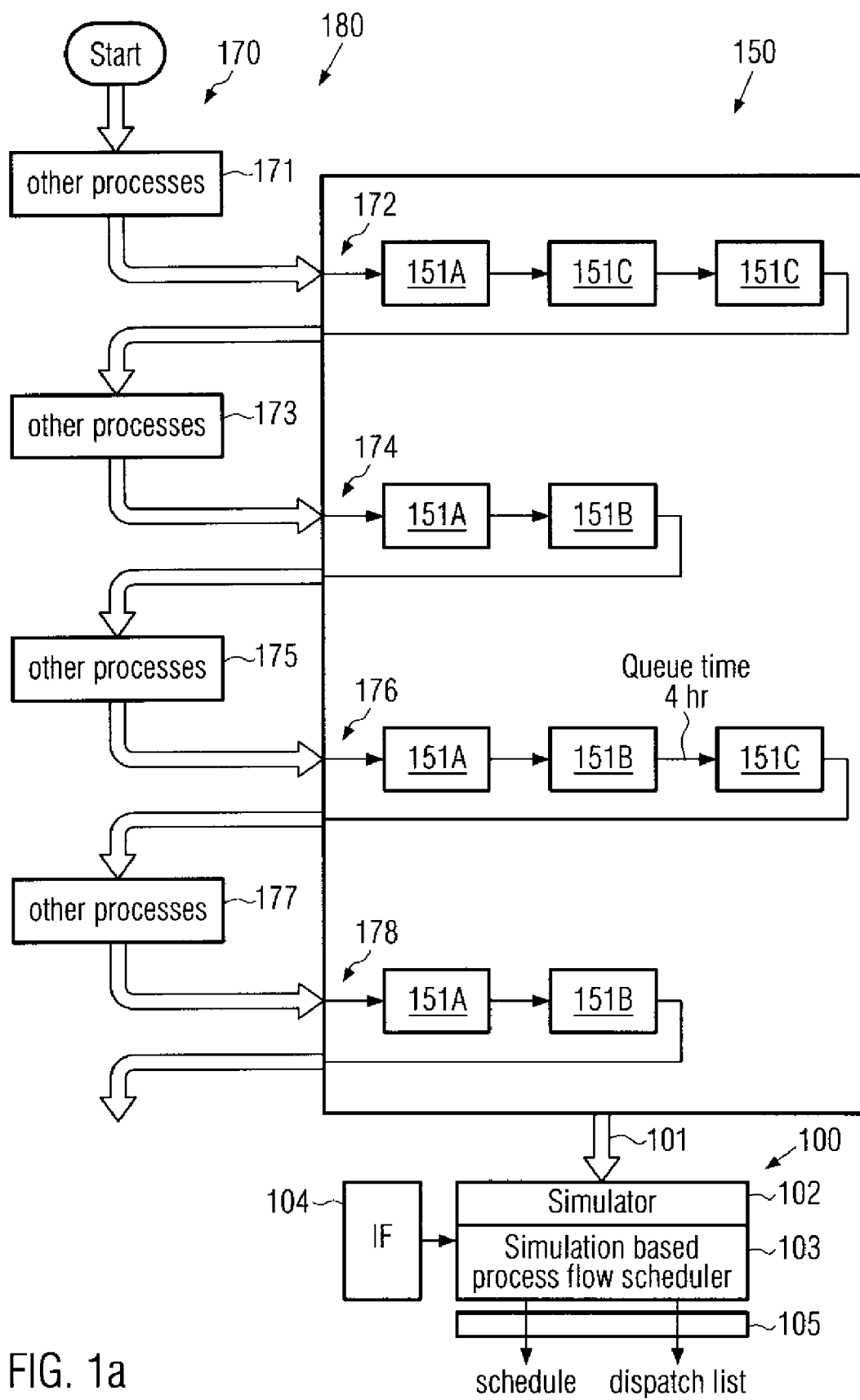
FIG. 1a schematically illustrates a production plant, such as a semiconductor facility, including a specified manufacturing environment and a simulation-based process flow scheduler according to illustrative embodiments of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present invention relates to an efficient technique for determining a schedule for a plurality of product entities within a specific manufacturing environment on the basis of a simulation model of the manufacturing environment. As previously explained, scheduling the process flows within a specific manufacturing environment may provide an "overview" over the manufacturing environment with respect to its future development for a specified time period, for which the schedule is determined. According to the present invention, tool and process specific constraints are automatically taken into consideration by using a model-based analysis of the process flow, thereby offering per se the information required for a meaningful schedule of the manufacturing environment. Furthermore, by defining one or more criteria, the production process in the specified manufacturing environment may be optimized or at least significantly enhanced with respect to the predefined criteria, wherein the approach of the present invention enables a high degree of flexibility in terms of adaptation to varying process conditions and changes in the manufacturing environment. The simulation model may automatically take into consideration the above-identified changes, thereby rendering a significant portion of the process of determining the schedule independent from the specific manufacturing environment. Selecting an adequate schedule from the simulation results may be based on predefined criteria that may be specifically determined in view of the goals to be achieved for the product entities to be processed in the manufacturing environment. For example, in modern production processes, re-entrant process flows must be frequently addressed in order to reduce investment costs for process tools and also enhance process tool utilization. Consequently, in semiconductor manufacturing processes, in which the process tools are a significant cost factor, semiconductor substrates are frequently processed by the same group of process tools at different stages of production process, thereby enhancing tool utilization while on the other hand contributing to process flow complexity, as product entities may be routed to a specific manufacturing environment from different points of the total process flow, thereby requiring a plurality of different process recipes to be performed in the respective process tool group.

It should be appreciated that, in the following detailed description of further illustrative embodiments, the fabrication of semiconductor devices may frequently be referred to since, in this industrial field, a plurality of different product types are frequently processed according to a highly complex overall process flow within a manufacturing environment comprising a plurality of different process tools, which may have different characteristics with respect to the operational behavior in terms of the number of product entities that may be processed at the same time, the throughput of product entities through the tool, the duration of the actual process performed by the process tool and the like. Consequently, a manufacturing environment related to the fabrication of semiconductor devices or other microstructural features may represent an industrial environment, in which the present invention is highly advantageous, wherein it should be appreciated, however, that the present invention may also be applied to other industrial fields in which products are produced in a highly complex process flow. Thus, the present invention should not be considered as being restricted to the fabrication of semiconductor devices, unless such restrictions are explicitly set forth in the following detailed description as well as in the appended claims.

With reference to FIGS. 1a-1g, further illustrative embodiments of the present invention will now be described in more detail. FIG. 1a schematically illustrates a production plant 180, which is configured to produce one or more types of products according to a specific general process flow 170, representing a stream of products through the plant 180, wherein the flow or stream 170 may comprise a plurality of "parallel" process flow branches, each of which is dedicated to a specific product type. In one illustrative embodiment, the production plant 180 may represent a semiconductor facility in which a plurality of different types of semiconductor devices may be manufactured corresponding to the overall process flow 170. That is, each product is passed within the general process flow 170 through the plant 180 being subjected to a type-specific sequence of process steps to finally obtain the completed product of the specific type.

The production plant 180 may comprise a specified manufacturing environment 150 which, in the embodiment shown, may represent a portion of the entire plant 180, while, in other embodiments, the manufacturing environment 150 may represent substantially the entire production plant 180. The manufacturing environment 150 may comprise a plurality of process tool groups 151A, 151B, 151C, wherein the process tool groups 151A, 151B and 151C may each represent one or more of equivalent process tools which are configured to perform substantially the same process. For instance, process tools belonging to the group 151A may represent pre-exposure process tools, which may, for instance, comprise a resist coating unit, a pre-bake unit and the like, while the tools belonging to the group 151B may represent lithography tools, while the tools representing the group 151C may be comprised of post-exposure tools, such as developer stations, post-exposure bake plates and the like. It should be appreciated that the number of different process tool types of the manufacturing environment 150 as shown in FIG. 1a is of illustrative nature only and more or less process tool groups 151A, 151B, 151C may be included in the environment 150. Moreover, the number of individual process tools in each process tool group 151A, 151B, 151C may vary, depending on the specifics of the production plant 180 and the manufacturing environment 150.

As an illustrative example, when the manufacturing environment 150 may represent a section of a semiconductor plant responsible for heat treatments and thermally driven deposition processes, the process tool group 151A may represent a plurality of cleaning stations, such as approximately 4-10 cleaning stations, having the capability of processing two lots of semiconductor substrates at a time with a process time of approximately 1 hour, the process tool group 151B may represent a plurality of rapid thermal anneal (RTA) tools, for instance 3-7 tools, each having the capability of processing single lots with typical process times from approximately 30 minutes up to several hours, and the process tool group 151C may represent a plurality of furnaces, for example approximately 20-25 furnaces, each of which may be capable of processing a batch of 4-6 lots with typical process times of approximately 2-8 hours. Consequently, in this illustrative example, the manufacturing environment 150 may represent a typical industrial manufacturing environment with high complexity, as the environment 150 may be subjected to re-entrant process flows comprising different tool types having very different process times.

During the operation of the production plant 180 at a specific point in time, the process flow 170 may start with certain processes indicated as 171 for a specific product entity, such as a lot of semiconductor substrates, while other product entities may already be processed in various stages of the process flow 170. For example, in stage 171, product entities may be processed in a specific manufacturing environment of the plant 180 to receive any treatments prior to entering the manufacturing environment 150. For example, any substrate handling processes may be performed at 171 and one or more entities, such as substrate lots, may be transferred to the environment 150 in order to run through a process sequence 172 involving process tools of the tool groups 151A and 151C. For instance, for the above-described illustrative example, a first step of the process sequence 172 may comprise a pre-oxidation cleaning process performed in one of the cleaning stations 151A, wherein subsequently an oxide layer, such as a buried oxide layer, may be formed in one of the furnaces of the group 151C. Thereafter, a silicon nitride layer may be deposited in one of the furnaces 151C, thereby completing the process flow sequence 172 within the environment 150. It should be appreciated that any substrate handling activities may also be taken into consideration, which are for convenience not explicitly referred to in this example. Thereafter, other processes may be performed in a process flow sequence 173 external to the environment 150 and subsequently the product entities may be re-transferred to the environment 150 to run through a further process flow sequence 174 within the environment 150. For example, a pre-oxidation cleaning process may be performed in one of the tools of the group 151A followed by a further formation of oxide in an RTA tool, i.e., a tool of the group 151B. Thereafter, the general process flow 170 may be continued by a further external sequence 175, after which respective product entities having run through the sequence 175 may again be re-routed to the environment 150 to run through a further process sequence 176, which may for instance comprise a pre-oxidation cleaning process in one of the tools 151A followed by the formation of a gate oxide in an RTA tool of the group 151B followed by the deposition of polysilicon in a furnace of the group 151C. Thereafter, a further external process sequence 177 may be performed, after which a further process sequence 178 may be carried out in the environment 150, for instance comprising a pre-clean process in one of the tools 151A followed by an RTA process for activating source and drain dopant in one of the tools of the group 151B.

As may be evident from FIG. 1a, since a plurality of different product entities, such as lots of semiconductor substrates, may be simultaneously processed in one of the external process sequences, 171, 173, 175, 177, a large number of different product entities may be processed within the environment 150 at a time, thereby requiring an efficient schedule for routing the large number of product entities through the environment 150 in accordance with the specified process flow sequences 172, 174, 176, 178. Typically, at least some of the process sequences 172, 174, 176, 178 performed in the manufacturing environment 150 may involve maintaining one or more process performance parameters within specified target ranges. For example, the queue time may frequently represent an important process flow parameter which may be maintained at a low value to reduce the number of product entities in process and to ensure staying within specific process limitations. For instance, process specifications for certain product entities or processes may require that a maximum queue time for certain processes may not be exceeded. That is, in order to obtain a high quality gate structure, it may be necessary to introduce a minimum queue time after the formation of the gate oxide in the process sequence 176, i.e., after processing a product entity in one of the tools 151B and prior to the deposition of polysilicon in one of the tools 151C. Other queue time restrictions may also be imposed on one or more of the other process sequences 172, 174, 178.

Another process flow parameter indicating the efficiency or performance of a process flow may be the batch size of process tools that are capable of processing a plurality of product entities, such as wafer lots, simultaneously. For a batch tool, a balance may be found between running with maximum batch size and thus optimal supply consumption versus running with optimal cycle time. Depending on process and product requirements, the scheduling of a process flow including a batch tool may therefore be based on determining an appropriate batch size for obtaining the desired balance between the above-identified operational modes. Another process flow parameter may be the cascading of process tools, which describes an operational mode, in which product entities are supplied to the process tool such that a substantially continuous flow of product entities may be obtained. Consequently, frequent setup changes of the respective process tool may significantly affect the throughput of the process tool under consideration. Consequently, the number of setups to be performed by a process tool may be taken into consideration when scheduling the process sequences 172, 174, 176, 178 within the environment 150. Another process flow parameter, which may indicate the overall process efficiency, is the availability of resources at a respective process tool at the time when the product entity arrives for processing. For example, a lithography tool may require certain reticles so that the availability of the reticles at the time of processing in the lithography tool may significantly affect the throughput of the lithography tool.

In addition to taking into consideration one or more process flow parameters, such as the parameters identified above, the characteristics of the various process tools of the environment 150 as well as certain manufacturing restrictions may also significantly influence the process flow in the environment 150 and may therefore be taken into consideration when establishing an appropriate schedule for the process sequences 172, 174, 176, 178. For example, certain process tools of the groups 151A, 151B, 151C may be dedicated to certain operations for specific product entities, that is, in many cases, not all members of a specific tool class may be allowed to process a specific type of product entities. For example, if the group 151C may represent furnaces, only certain furnaces may be appropriate for forming an adequate polysilicon layer for highly scaled semiconductor devices, while other, less critical semiconductor devices may be processed in any of the other furnaces of the group 151C. Other manufacturing restrictions may be such that only product entities having identical process specifications may be combined as a batch for being processed in a corresponding batch process tool. Moreover, a certain hierarchy for the product entities may be established such that entities of high priority may be processed without requiring a certain batch size to be achieved prior to the processing in a batch tool. Other process restrictions may be related to tool availability that may be restricted by required maintenance operations and engineering activities.

In order to appropriately schedule product entities within the manufacturing environment 150 and any incoming product entities, a product scheduling system 100 is provided, which is operatively related to the environment 150 in a sense that the system 100 is configured to receive process-related information from the environment 150, wherein the corresponding process information, for instance, includes status information of the various process tools 151A, 151B, 151C and status information of the various product entities being processed in the environment 150 or that are to be processed in the environment 150 and the like. For receiving any appropriate process information, the system 100 may comprise an input section 101, which may be connected to a supervising control system, such as a manufacturing execution system (MES), as is typically provided in highly automated production plants. In some illustrative embodiments, the system 100 may comprise a user interface 104, which may be configured to transfer process-related information, input by a user, to the input section 101. Thus, a high degree of operational flexibility of the system 100 may be provided, since updated process information or any other schedule-related information may be readily input into the system 100. It should also be appreciated that the input section 101 may also be configured to gather process-related information from the environment 150 at least partially directly from the environment 150, for instance in the form of status information of the respective process tools 151A, 151B, 151C, depending on the degree of automation in the environment 150. The system 100 further comprises a process simulator 102 connected to the input section for receiving the process information therefrom and to determine a simulation result of the process flow sequences 172, 174, 176, 178 on the basis of respective simulation models, which may have implemented therein tool characteristics and process specifications in the form of, for example, criteria requiring a setup in specific process tools, any tool dedications, the operational modes of the tool and the like. For example, the process simulator 102 may have implemented therein the tool characteristics for each of the process tools belonging to each of the groups 151A, 151B, 151C, thereby enabling the prediction of cycle times for specific process recipes, the consumption of supply gases and the like, in combination with the current tool status, such as the tool availability with respect to engineering activities, maintenance, non-scheduled down times and the like. For example, the status of a process tool may be classified on the basis of a plurality of predefined states, thereby providing the potential for estimating the current and the future behavior of the process tool. Consequently, the process simulator 102 may calculate the process output of each of the process flows 172, 174, 176, 178 in the environment 150 on the basis of the respective process models and the process-related information at least with respect to cycle time and thus throughput. For instance, based on the recipes to be performed in the sequence 172 for a specific type of product entity, the process simulator 102 may be configured to provide a simulation result, for instance in terms of a total process cycle time of the sequence 172, wherein the corresponding simulation result may automatically take into consideration any tool and process restrictions initially included in the respective simulation model.

It should be appreciated that efficient process models may be established on the basis of research and development activities or on the basis of data stored in respective databases of a supervising control system, such as an MES, which may enable a detailed analysis of process tool activities and the like. In some illustrative embodiments, the simulation model of the simulator 102 may include a description of the current process flow 170, that is, for the environment 150, the process sequences 172, 174, 176, 178, the specifications for the respective process flows as currently valid, the product entities presently being processed in the flow 170, the various cycle times as currently determined and the current tool dedications, batching conditions for the respective process tools and the current tool status. In some illustrative embodiments, a reduced version of the model may be used, wherein the reduced model may contain all production tools of the manufacturing environment 150, as is illustrated in FIG. 1a, whereas other tools, such as metrology tools or tools outside of the manufacturing environment 150, such as tools corresponding to the process flow sequences 171, 173, 175, 177, may be described in the model as static time delays according to the presently valid cycle times of these tools. By using a reduced simulation model, the speed of the simulation may be significantly enhanced, substantially without losing any relevant information.

The system 100 may further comprise a simulation-based process flow scheduler 103 that is configured to determine a schedule for the process flows 172, 174, 176, 178 on the basis of the simulation results provided by the simulator 102. For example, in some illustrative embodiments, the process simulator 102 may provide a plurality of simulation results from which the scheduler 103 may select one simulation result, representing a time progression of the various process flows within the environment 150, in order to establish a schedule for each product entity within the environment 150 within a predefined time horizon. In some illustrative embodiments, the system 100 may further comprise an output unit 105 for providing information on the established schedule to an external source, such as an operator, a supervising control system and the like.

During operation of the system 100, the simulator 102 may be initialized on the basis of process information obtained via the input section 101, wherein the initialization process may include to set the "virtual" tools, that is, the simulation models of the process tools of the environment 150 to an operating state as indicated by the status information included in the process information received. Similarly, the status information with respect to any product entities currently processed within the environment 150 may be used to start the simulation of the environment 150 on the basis of the currently encountered process situation. Moreover, the status information of any product entities that are presently processed in other manufacturing environments, such as environments associated with the external process sequences 171, 173, 175, 177, may in some illustrative embodiments also be supplied to the simulator 102, wherein, for reducing complexity of the simulation model, external product entities may be associated with given process times in order to provide an expected arrival time at the manufacturing environment 150. In still other illustrative embodiments, the simulator 102 may be initialized by simulating "backwards" in time, wherein the simulation results may be immediately corrected or modified in order to substantially represent the process situation based on actually obtained process information. In this way, the simulator 102 may appropriately "lock in" into the environment 150 and may, after all process tools and product entities are correctly represented by the simulation model, be reversed in time so as to produce simulation results for a predefined time horizon. However, other initialization schemes may also be used as long as the current process situation is appropriately represented by the simulator. From the simulation result, i.e., the time progression of the various product entities within the environment 150 for the predefined time interval, the relevant data for establishing a schedule for the environment 150 may be extracted by the scheduler 103 and may then be provided to any external source via the output unit 105. In this way, a schedule may be established in which tool and process restrictions may be efficiently taken into consideration by the under-lying process models. In other illustrative embodiments, the simulator 102 may provide a plurality of simulation results, each of which may be based on a different initialization state, yet appropriately representing the current process situation, for exampling by assuming a different hierarchy of process restrictions in order to provide a plurality of possible future developments within the environment 150, from which the scheduler 103 may select an appropriate one, which provides a schedule that is in compliance with predefined criteria. For instance, one or more process flow parameters, such as queue time, batch size and the like, may be assigned different values in order to obtain different future process situations, from which the scheduler 103 may select the most appropriate one for extracting the required data for establishing the schedule.

Figure 1B:
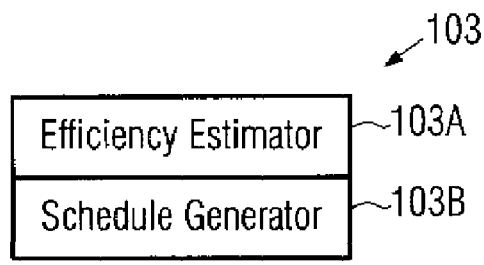
FIG. 1b schematically illustrates the scheduler of FIG. 1a according to a further illustrative embodiment including a process flow efficiency estimator.

FIG. 1b schematically shows the scheduler 103 according to one illustrative embodiment, in which the scheduler 103 comprises a process flow efficiency estimator 103A and a schedule generator 103B. The efficiency estimator 103A may be configured to evaluate the simulation result obtained from the simulator 102 with respect to one or more criteria, which may indicate the efficiency of the process flow within the environment 150. In the illustrative examples described above, wherein the simulator 102 may provide a plurality of simulation results for the predefined time horizon, the efficiency estimator 103A may evaluate the different simulation results on the basis of at least one efficiency value and may then select the simulation result having the efficiency value that is closest to a predetermined target value. Based on the selected simulation result, the schedule generator 103B may then extract the required data from the selected simulation result to establish the schedule for the environment 150. For example, an appropriate efficiency value may be represented by the total throughput of the environment 150, also the magnitude of any queue time violation may represent an appropriate efficiency value, wherein the simulation result offering the smallest queue time violation may be selected. However, it should be appreciated that any other parameters, such as tool utilization, raw material consumption and the like, or any other combination of the aforementioned parameters, may be used as parameters for establishing an efficiency criterion. In some illustrative embodiments, each product entity may have assigned thereto an efficiency value that may be compared with a target value in order to identify one of the simulation results as an appropriate one.

Figure 1C:
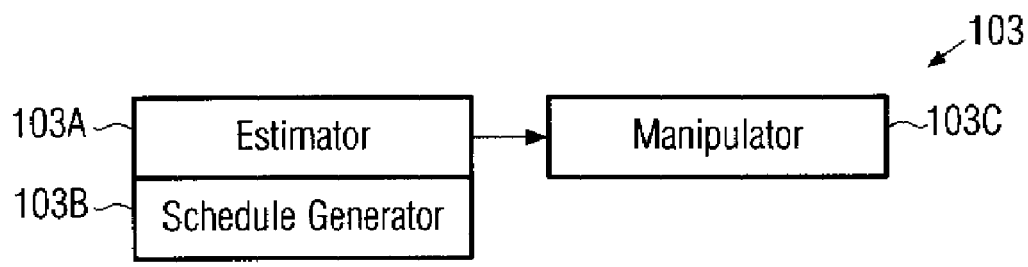
FIG. 1c schematically illustrates the scheduler of FIG. 1a according to another illustrative embodiment.

FIG. 1c schematically illustrates the process scheduler 103 according to still other illustrative embodiments, wherein a manipulating unit 103C is provided, which is connected to the estimator 103A in order to obtain an evaluation of one or more simulation results provided from the simulator 102. The manipulator 103C is configured to operate on the input data for the simulator 102 so that the simulator 102 may operate on the basis of modified input data, thereby producing a different simulation result, which may then again be evaluated by the estimator 103A with respect to the process efficiency of the corresponding simulated process progression in the environment 150.

Figure 1D:
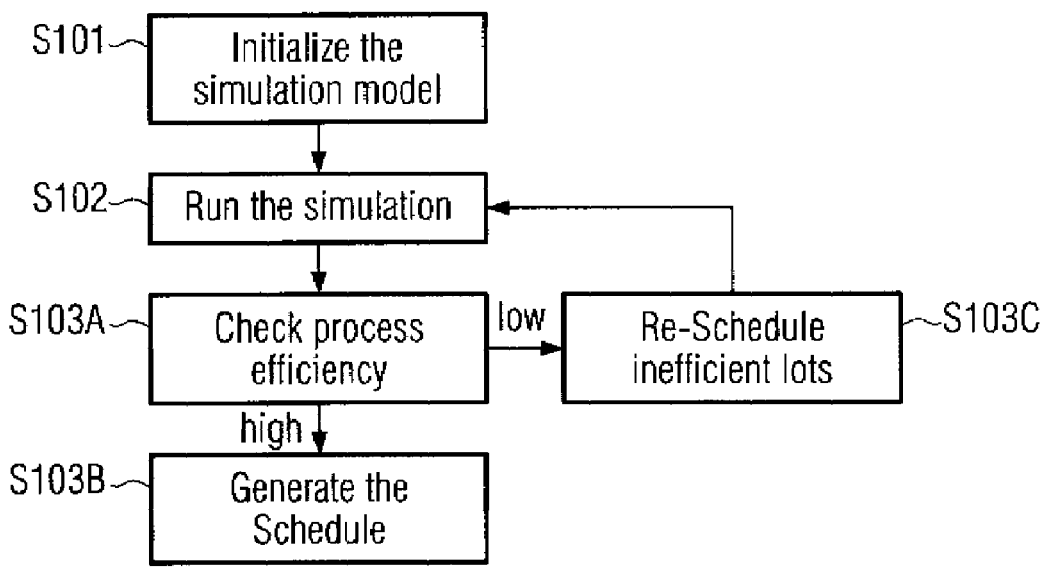
FIG. 1d schematically illustrates a flowchart of one illustrative operational mode of the system of FIG. 1a including a process efficiency estimator and a re-scheduling unit in accordance with further illustrative embodiments of the present invention.

FIG. 1d schematically illustrates a flow chart which represents the operation of the system 100 comprising the scheduler 103 that is configured as is shown in FIG. 1c. In step S101, the simulation model in the simulator 102 is initialized on the basis of information provided by the input section 101. In step S102, the processing of the product entities in the plurality of process tools 151A, 151B, 151C is simulated for a certain time horizon, such as 24 hours and the like, wherein all manufacturing restrictions included in the simulation models and deemed relevant, such as the restrictions as pointed out above, may be taken into consideration. The simulation result may be obtained in the form of a report including the time progression of the processing of the plurality of product entities within the environment 150.

In step S103A, the process efficiency may be evaluated, which may be accomplished on the basis of dedicated software modules and the like, wherein simulation results in the form of processing reports may be parsed, that is, all process sequences 172, 174, 176, 178 including the various process flow sections therein, at least those sections that are deemed relevant for the process efficiency, may be checked for each product entity processed in the respective process flow sections. If any product entities are detected that may have been processed in an inefficient manner, the corresponding product entities may be marked so that in step S103C the simulation input files may be manipulated in order to provide different start conditions or process restrictions for the simulator 102. For instance, if in step S103A an inefficiency with respect to a predefined criterion, such as waiting for reticles, waiting for batch completion, a queue time violation and the like, is detected, an appropriate modification of the simulator input files may be performed in step S103C, for instance by modifying a tool status, changing a process restriction and the like. For instance, when the simulation result communicates an undue inefficiency due to waiting for reticles at a specific lithography tool, the corresponding tool may be identified as being in a non-available state and consequently the simulation may be restarted with modified status information. In the following run of the simulation model, in step S102, the changes of the model files are taken into consideration and may lead to a different simulation result, which may then again be assessed by the estimator in step S103A. This process of running the simulation model in step S102, parsing its output by the estimator in step S103A, manipulating one or more parameters of the process information in step S103C and re-running the model on the basis of the manipulated information in step S102 may be repeated until the process efficiency parameter is within a predefined target range, or a predefined number of simulation runs has been performed, wherein then, in step S103A, the estimator 103A may select one of the simulation results for generating the actual schedule. Thus, in some illustrative embodiments, in step S103A, a preliminary schedule may be established with a correspondingly assigned efficiency value or with a plurality of efficiency values, wherein subsequently, in step S103C, the preliminary schedule may be re-scheduled, for instance by delaying or advancing one or more product entities in the preliminary schedule, and a corresponding time delay or advance of the involved product entities and process tools may be entered into the simulation model for re-simulating the process flow in the environment 150. When an appropriate simulation result is detected in step S103A, the schedule is generated in step S103B, wherein, for instance, an appropriate algorithm may be used in order to parse the simulation result, which may be provided in the form of a processing report in order to extract required schedule data. The information extracted from the simulation result, which is relevant for generating the schedule, may then be provided to external sources, such as operators, a supervising control system and the like.

It should be appreciated that in the above-described process scheme, the steps S103A and S103C may be designed in accordance with company internal requirements, that is, these process steps may be designed in order to obtain a schedule in a form that provides enhanced efficiency with respect to certain criteria, such as throughput, product quality and the like, while all other steps in the architecture are substantially independent from application-specific criteria. That is, by establishing the simulation models, the process described above for creating an appropriate schedule is substantially adapted to any specific manufacturing environment 150, irrespective of its actual implementation, and thus the steps S101, S102 and S103B may be performed independently of a specific type of manufacturing environment. On the other hand, schedule optimization may be individually adjusted to specific environments by appropriately designing the steps S103A and S103C. Consequently, a high degree of stability in using the system 100 is achieved. The iterative approach of the architecture as shown in FIG. 1d may be used, even if a moderately low time resolution of the simulation is employed. For example, the simulation run may provide for a relatively small time horizon, for instance 1 hour, wherein any inefficiency may then be handled as is described above in FIG. 1d so that the handling of any process inefficiencies may be performed on a less complex simulation result. Thus, upon the detection of a further inefficiency in a later time slot, the new simulation may be started on the basis of the previously remedied simulation result, thereby providing the potential for more efficiently correcting for process inefficiencies, since the manipulation of the simulation input files in step 103C may be performed "closer" to the point in time when the inefficiency occurs during the simulation.

Figure 1E:
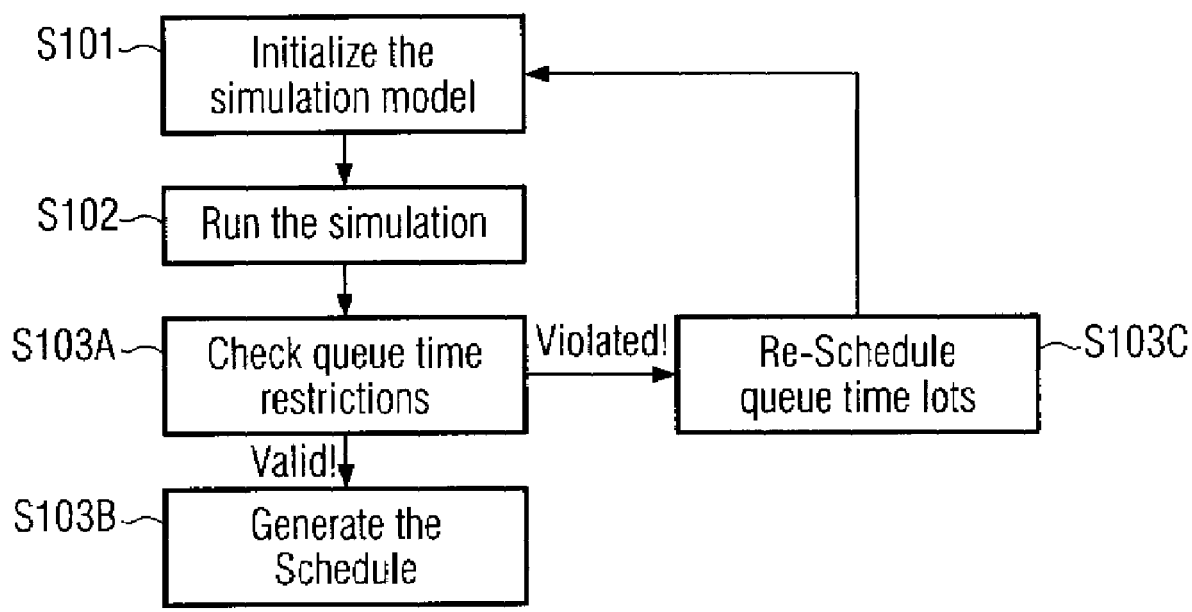
FIG. 1e schematically illustrates a flowchart of one illustrative operational mode of the system of FIG. 1a when adapted to a queue time related process efficiency estimation according to one illustrative embodiment of the present invention.

FIG. 1e schematically illustrates the flowchart of FIG. 1d, wherein, in step S103A, the process efficiency is estimated on the basis of queue time restrictions for the environment 150. As an illustrative example as described above, the process tools of the group 151A may represent cleaning stations, the tools of the group 151B may represent RTA tools and the tools of the group 151C may represent furnaces. In this illustrative example of the environment 150, the aspect of queue time violation may represent an important process restriction, since product quality may be closely connected to the time interval between certain heat treatments and/or deposition processes. It is therefore critical in this illustrative example to establish the schedule for the environment 150 on the basis of a minimal queue time violation, wherein, in this illustrative example, it may be assumed that the queue time violation, as for instance indicated in FIG. 1a, of 4 hours in the process flow 176 may not be exceeded. It should be appreciated however that any other choice for queue time restrictions and estimation of the queue time efficiency may be used. Moreover, other process flow parameters may be used for establishing the schedule wherein, for instance, in the environment 150, one process restriction in the simulator may be the compilation of appropriate batches at the process tools of the group 151C, i.e., in this example the furnaces, so as to achieve an efficient utilization of the furnaces. For example, a process restriction may be that the processing at the tools of the group 151A, i.e., the cleaning stations, be organized such that appropriate batch sizes may arrive at the furnaces 151C during the process flow 176.

Consequently, in step S103A of the flowchart of FIG. 1e, at least the process flow 176 may be checked with respect to any queue time violation of product entities waiting for processing in one of the tools belonging to the group 151C, wherein, when such a queue time violation is detected in step S103A, in step S103C, a corresponding re-scheduling of the respective product entities may be performed, for instance on the basis of redefining the process start time at the tools of the group 151A in such a way that an increased queue time may be obtained in any other sections of the process flow 176 which are not critical for the product entities. For example, the simulation result obtained in step S102, i.e., the product entity processing report written during the simulation run, may be parsed with respect to any queue time violations, at least for those product entities to be processed in the process flow 176. It should be appreciated that other queue time restrictions may be present in the environment 150 and hence all product entities or at least product entities in process flows having a queue time restriction may be correspondingly evaluated. If any product entities are detected which violate their queue time specification, in some illustrative embodiments, these product entities may be re-scheduled for the next simulation run for the processing in the tools belonging to the group 151A. In other illustrative embodiments, one or more product entities and/or process tools may be "modified" in order to reduce or remove the queue time violation within the process sequence 176. For example, if a queue time violation in the process flow 172, in which process tools of the type 151C are also used, is less critical, corresponding product entities processed in one of the tools 151C during the sequence 172 may be re-scheduled to provide increased process capacity for product entities processed according to the sequence 176. As previously explained, the steps S102, S103A and S103C may be repeated until the queue time restrictions in the process flow 176 are no longer violated and then the schedule may be generated in step S103B, as previously described. In the illustrative embodiment shown in FIG. 1e, the re-scheduling performed in step S103C may result in a delay of the processing of product entities at tools of the group 151A according to the magnitude of the detected queue time violation. Consequently, a modified status information may be used for the corresponding product entities, which may then be used for initializing the simulation model in step S101 on the basis of the modified status information. A corresponding sequence for establishing a schedule for the above-illustrated embodiment will be described in more detail with reference to FIGS. 1f and 1g.

Figure 1F:
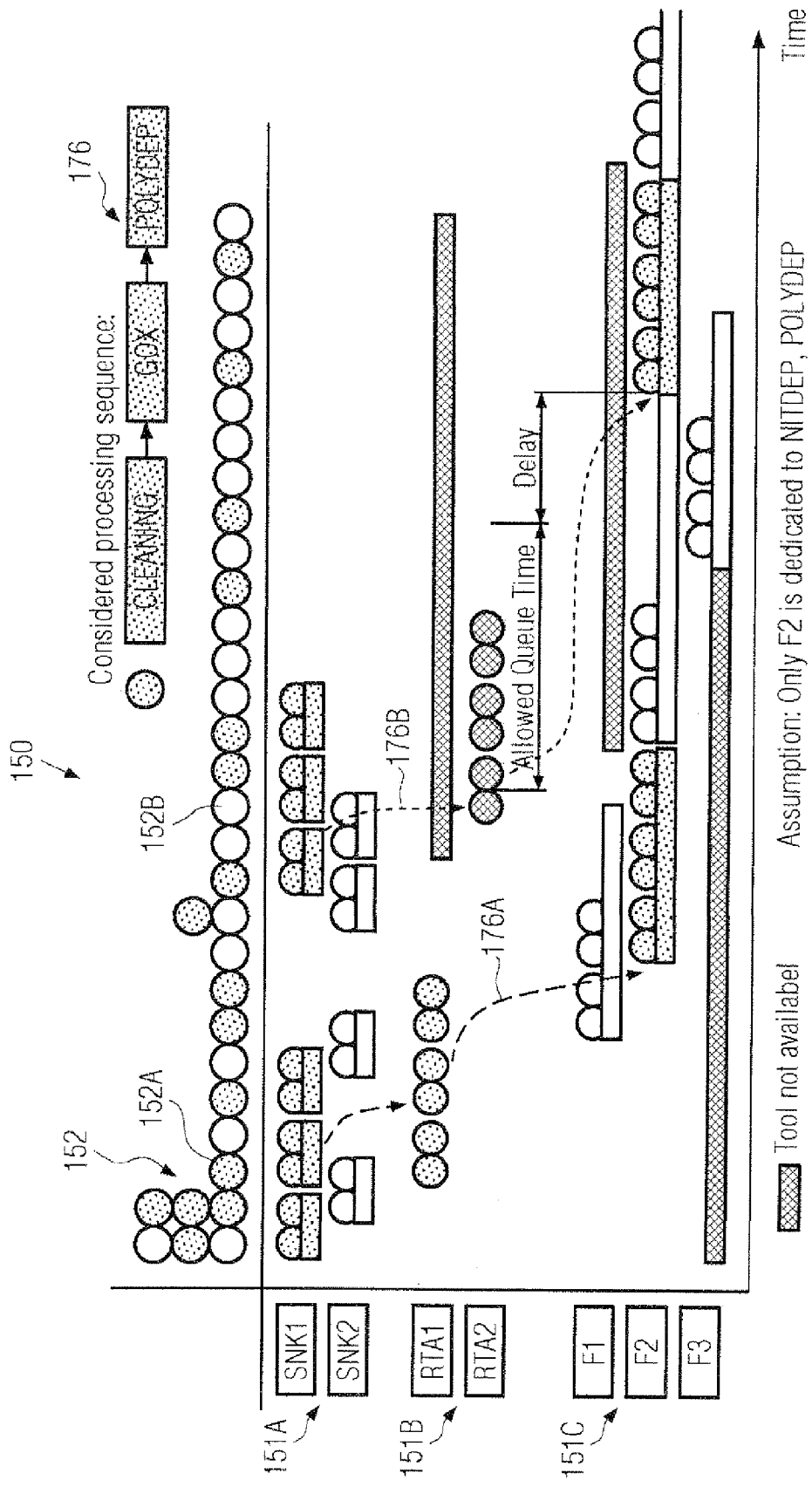
FIG. 1f schematically illustrates a process flow simulation result obtained from the system as shown in FIG. 1c according to an initial or preliminary schedule.

FIG. 1f schematically illustrates the environment 150 having two process tools of the group 151A, two process tools of the group 151B and three process tools of the group 151C, wherein it is assumed that, from the group 151C, only process tool F2 is dedicated to nitride deposition and poly deposition. Moreover, FIG. 1f schematically illustrates the simulation result for the process sequence 176 with a queue time restriction of 4 hours between a process performed by a process tool of the group 151B and a process tool of the group 151C. A plurality of product entities 152, which may represent semiconductor lots and the like, are available at the process tools of the group 151A, which may represent cleaning stations, as previously described. Among the plurality of product entities 152, a certain amount of product entities 152A require a processing according to the sequence 176, i.e., may receive a gate oxide and a polysilicon deposition, while other product entities 152B may require a different processing according to one of the process sequences 172, 174, 178 as shown in FIG. 1a. As previously explained, the simulation may run under certain process restrictions, wherein one of the restrictions may require a batch size of six product entities 152 for products of the group 152A requiring a polysilicon deposition in the dedicated tool of the group 151C. Moreover, as is indicated in FIG. 1f, some of the process tools 151 may have a reduced availability due to circumstances, such as maintenance, engineering and the like. For example, one tool of the group 151B may not be available for a certain time period, as is also the case for two of the tools of the group 151C. The dashed line in FIG. 1f may indicate the process flow 176A for a portion of the product entities 152A, for which the corresponding simulation result predicts a valid process efficiency, since the corresponding product entities may be immediately processed in the dedicated furnace F2 of the group 151C after the last product entity is processed by the first tool RTA1 of the group 151B. The product entities 152A processed by the flow 176A may be identified as having a valid queue time efficiency.

On the other hand, the process flow sequence 176B for other product entities of the group 152A, indicated as a dotted line, may exhibit a queue time violation, since the product entities processed in the second RTA tool of the group 151B may have to wait for the availability of the tool F2 of the group 151C, since the corresponding tool is the only tool dedicated to the polysilicon deposition and is not available within the allowed queue time due to the processing of product entities of the group 152B, belonging to a different process sequence. Consequently, based on this simulation result, process sequence 176B for the corresponding product entities 152A may be indicated as a non-valid process flow, wherein, in one illustrative embodiment, the amount of queue time violation may be calculated in step S103A as a measure of the process efficiency. Thus, the calculated amount of queue time violation may then be used for modifying the corresponding status information of the involved product entities 152A, which may be marked as product entities to be delayed for being processed in one or more of the previous process steps. For example, the processing of the tools of the group 151A may be delayed according to the calculated amount of queue time violation.

Figure 1G:
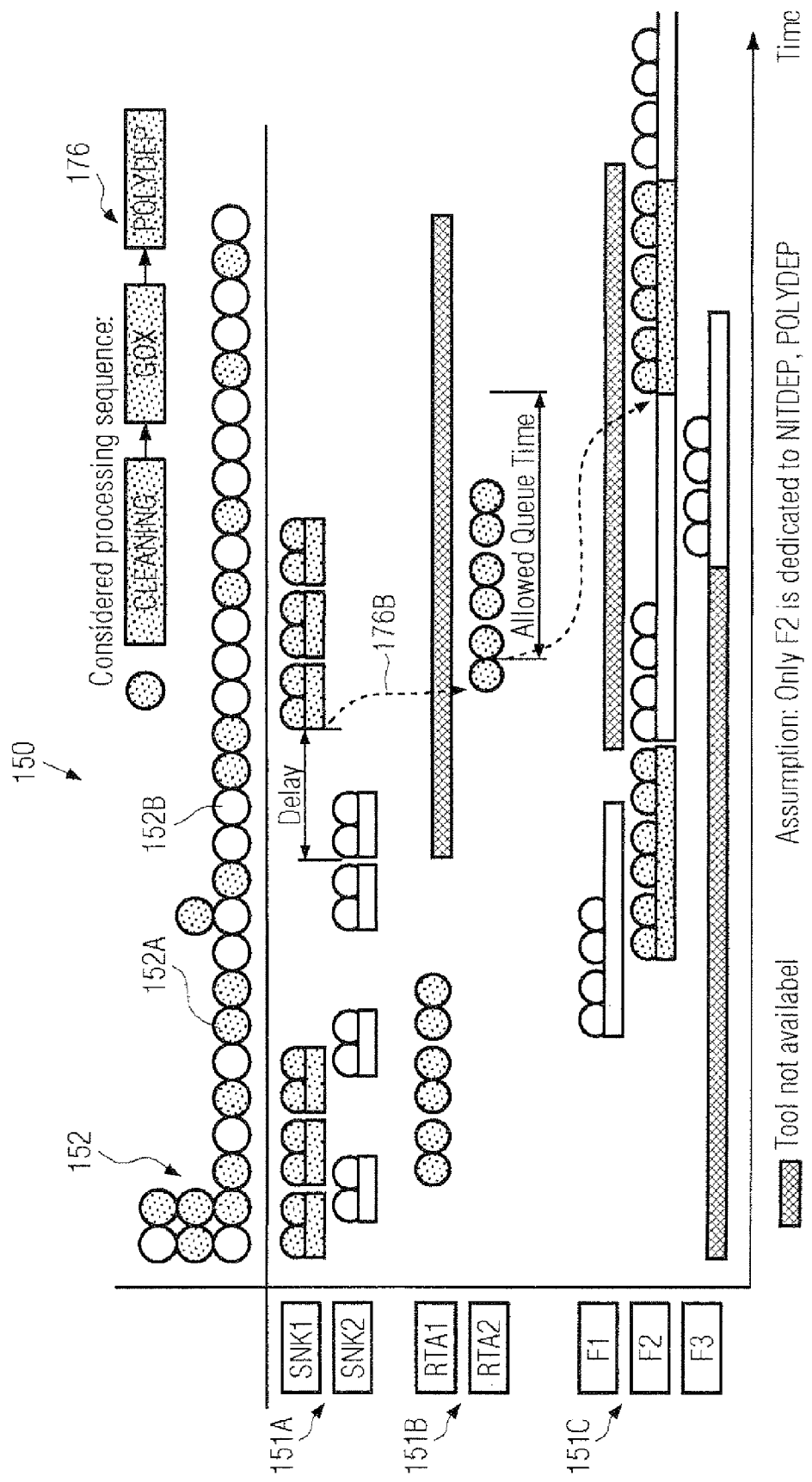
FIG. 1g schematically illustrates the simulation result of a re-scheduled process flow obtained according to illustrative embodiments of the present invention.

FIG. 1g schematically illustrates the situation wherein a simulation result is shown in which the status information for initializing the simulation model has been modified to demand a specific delay of the processing of the respective product entities 152A as obtained at the tools of the group 151A. That is, in the re-simulated process flow 176B, the corresponding product entities 152A will be processed at a later stage, wherein the amount of delay may substantially correspond to the amount of queue time violation determined in the simulation result as shown in FIG. 1f. Consequently, the product entities processed by the process sequence 176B now represent valid product entities staying within the queue time specification. It should be appreciated that the queue time violation may also be removed by correspondingly delaying the processing of the corresponding product entities at the RTA tool of the group 151B or by appropriately dividing the required delay between the operation at the tools of the group 151A and the tools of the group 151B. The procedure described above may be performed for each of the product entities 152 entering the environment 150 for each of the various process sequences 172, 174, 176, 178 when other queue time restrictions are to be obeyed in the respective process sequences.

It should be appreciated that a corresponding re-simulation may also be based on other process flow parameters, depending on the specific requirements for optimizing or enhancing the process flow in the environment 150. For example, if the environment 150 may represent a manufacturing environment in which queue time restrictions are less critical, the overall throughput of the environment 150 may represent an important aspect wherein, for instance, the queue time periods of the various product entities in the various process sequences may be estimated, for instance with respect to a waiting time period for dedicated process tools, such as lithography steppers and the like, in order to enhance or optimize a throughput of these dedicated process tools, thereby reducing overall manufacturing costs, when tools of high investment costs may have a high degree of utilization. As previously described, the corresponding steps 103A and 103C for estimating the process efficiency on the basis of predefined criteria as well as any algorithms for removing or reducing any inefficiencies may be established on the basis of company internal requirements, while the remaining overall architecture may be provided substantially independently from other specifics of the manufacturing environment 150.

As a result, the present invention provides an efficient technique for the generation of schedules of a manufacturing environment, wherein the schedule is based on simulation results of the manufacturing environment. Due to the models used in the simulation, the corresponding simulation results provide a highly reliable prediction of the future time progression of the environment 150, from which then appropriate data may be extracted for the generation of a schedule. In this way, any process and tool restrictions, as well as the specifics of process recipes, are automatically available, thus providing a high degree of flexibility in adapting the scheduling technique to any desired manufacturing environment, wherein, depending on the available computational resources, an entire production plant or dedicated portions thereof may be efficiently taken into consideration. Since the simulation result obtained may also be parsed with respect to predefined criteria, such as process flow efficiency parameters, the schedule of the manufacturing environment may be enhanced or optimized with respect to application-specific requirements. Consequently, by defining a specific efficiency value for one or more product entities, inefficient product entities may be readily identified and a corresponding modification of the input files of the simulation step may be performed in order to reduce or correct any process flow inefficiencies. Since appropriate process models may be readily available or may be generated in short time periods, the corresponding process for establishing a schedule may be repeated frequently to provide updated schedules on a regular basis or on demand, wherein presently a computational power of a standard PC may allow presenting a schedule with a time horizon from several hours to several days within several minutes for a manufacturing environment comprising approximately 10-50 semiconductor process tools. For example, for the illustrative process environment 150 including cleaning stations, RTA tools and furnaces operating on approximately 10-30 different types of product entities, the generation of a schedule may take several seconds to several minutes, thereby providing the potential for updating the schedule with a sufficient time resolution in order to continuously adapt the scheduling to the actual process situation in the environment. Moreover, interface and output units may be provided to reflect planned future actions within the schedule horizon and to allow operator interaction with the scheduling system. For example, user interaction may be required to specify events and conditions that may not be present in databases of a supervising control system, such as upcoming engineering times or test runs and the like. Moreover, frequent tool dedications and the like, which may not be present in the corresponding databases, may be efficiently entered into the system wherein data provided by the interface may be written into files, which may be evaluated during the automated generation of any simulation models used for simulating the corresponding manufacturing environment. Moreover, appropriate dispatching lists of the manufacturing environment under consideration may be established on the basis of the schedules provided by the system of the present invention.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
initializing, in a process simulator, a simulation model of a process sequence in a manufacturing environment with process information from a plurality of process tools of said manufacturing environment and a plurality of product entities to be processed or being processed in said manufacturing environment in a plurality of concurrent process flows, wherein each process flow operates according to a different one of a plurality of process recipes, and wherein at least one of the plurality of product entities re-enters at least one of the plurality of process tools during at least one corresponding process flow;
performing, in the process simulator, a plurality of simulations of the process sequence for said plurality of product entities in said manufacturing environment on the basis of said process information, said plurality of process recipes and a model for each of said plurality of process tools to generate a plurality of simulation results of said process sequence, each simulation beginning at a different initialization state of the plurality of concurrent process flows so that each simulation result represents a different time progression of the product entities within said manufacturing environment within a predefined time interval;
selecting, in a process scheduler, one of the simulation results using a predefined criterion; and
establishing, in the process scheduler using said one of the simulation results, a schedule for processing said plurality of product entities in said manufacturing environment in the plurality of concurrent process flows.

2. The method of claim 1, further comprising dispatching said plurality of product entities into said manufacturing environment on the basis of said schedule.

3. The method of claim 1, wherein selecting said one of the simulation results using the predefined criterion comprises:
estimating a plurality of process efficiencies of said process sequence on the basis of said simulation results prior to establishing said schedule; and
selecting said one of the simulation results that has the highest estimated process efficiency.

4. The method of claim 3, wherein estimating each process efficiency comprises establishing a preliminary schedule and determining at least one process efficiency value for said plurality of product entities on the basis of said preliminary schedule.

5. The method of claim 4, wherein determining said at least one process efficiency value comprises determining one process efficiency value for each of said plurality of product entities on the basis of said preliminary schedule.

6. The method of claim 4, further comprising modifying said preliminary schedule for at least one of said plurality of product entities and performing a new simulation at least once on the basis of said modified preliminary schedule, when said at least one process efficiency value does not meet a predefined process efficiency criterion.

7. The method of claim 6, wherein estimating said plurality of process efficiencies comprises defining a valid value range for at least one process flow parameter related to said at least one process efficiency value and evaluating whether a simulated value of said at least one process flow parameter for each of said product entities is within said valid value range.

8. The method of claim 7, wherein said at least one process flow parameter comprises at least one of a queue time, a batch size, a cascading of product entities at each process tool, a resource availability at each process tool, a dedication of process tool, a process specification for each product entity, a hierarchy of product entities and availability of each process tool.

9. The method of claim 6, wherein, when a predetermined number of new process simulations is performed, said schedule is established by selecting one of the predetermined number of preliminary schedules having the highest process efficiency value.

10. The method of claim 1, wherein said manufacturing environment comprises at least one of a metrology tool and a tool external to said manufacturing environment, and said at least one of a metrology tool and an external tool being represented in said model as a static time delay for each product entity to be processed by said at least one of a metrology tool and an external tool.

11. The method of claim 1, wherein said process information is received at least partially from a control system operatively connected to said manufacturing environment.

12. The method of claim 11, wherein a portion of said process information is received by a user interface.

13. The method of claim 1, further comprising establishing a dispatch list on the basis of said schedule.

14. The method of claim 1, wherein said plurality of product entities comprise semiconductor devices.

15. A product scheduling system, comprising:
an input section configured to receive process information relating to a plurality of product entities and a plurality of process tools of a manufacturing environment, said plurality of product entities to be processed or being processed in a process sequence in said manufacturing environment in a plurality of concurrent process flows, wherein each process flow operates according to a different one of a plurality of process recipes, and wherein at least one of the plurality of product entities re-enters at least one of the plurality of process tools during at least one corresponding process flow;
a process simulator configured to perform a plurality of simulations on the basis of said process information to generate a plurality of simulation results, each simulation beginning at a different initialization state of the plurality of concurrent process flows so that each simulation result represents a different time progression of each of said plurality of product entities in the process sequence in said manufacturing environment during a predefined time interval; and
a process scheduler configured to select one of the plurality of simulation results and to establish a schedule for each of said product entities in the plurality of concurrent process flows on the basis of said selected one of the plurality of simulation results.

16. The product scheduling system of claim 15, further comprising a process flow efficiency estimator configured to determine a plurality of values of at least one predetermined process flow parameter on the basis of said plurality of time progressions.

17. The product scheduling system of claim 16, further comprising a manipulation unit configured to re-schedule a time progression when said value is outside a predefined range and to instruct said process simulator to provide an updated time progression on the basis of said process information and said re-scheduled time progression.

18. The product scheduling system of claim 15, wherein said input section comprises a user interface configured to provide at least a portion of said process information by a user.

19. The product scheduling system of claim 18, further comprising an output unit configured to provide said schedule to an external source, said schedule provided by said output unit indicating a process sequence for each of said plurality of process tools.

20. The product scheduling system of claim 19, wherein said output unit is further configured to establish and provide a dispatch list indicating the time of release of each of said product entities into said manufacturing environment.

21. The product scheduling system of claim 15, wherein said process scheduler is configured to establish said schedule for semiconductor products.

* * * * *